United States Patent
Gomi et al.

(10) Patent No.: US 8,157,400 B2
(45) Date of Patent: Apr. 17, 2012

(54) LIGHT EMITTING APPARATUS, DISPLAY APPARATUS AND METHOD FOR MANUFACTURING LIGHT EMITTING APPARATUS

(75) Inventors: Shuji Gomi, Chiba (JP); Shuichi Naijo, Chiba (JP)

(73) Assignee: Showa Denko K.K., Tokyo (JP)

( * ) Notice: Subject to any disclaimer, the term of this patent is extended or adjusted under 35 U.S.C. 154(b) by 548 days.

(21) Appl. No.: 12/373,965

(22) PCT Filed: Jul. 19, 2007

(86) PCT No.: PCT/JP2007/064260
§ 371 (c)(1),
(2), (4) Date: Jan. 15, 2009

(87) PCT Pub. No.: WO2008/013097
PCT Pub. Date: Jan. 31, 2008

(65) Prior Publication Data
US 2009/0284952 A1    Nov. 19, 2009

(30) Foreign Application Priority Data
Jul. 25, 2006 (JP) .................................. 2006-202093

(51) Int. Cl.
*G09F 13/08* (2006.01)
*F21V 21/00* (2006.01)
*F21V 3/00* (2006.01)
*F21V 17/06* (2006.01)

(52) U.S. Cl. ............. 362/97.3; 362/249.02; 362/311.02; 362/311.15; 362/456

(58) Field of Classification Search ........ 362/97.1–97.4, 362/232, 244, 249.02, 311.02, 311.14, 311.15, 362/455, 545, 326, 456; 313/512; 257/100
See application file for complete search history.

(56) References Cited

U.S. PATENT DOCUMENTS
5,298,768 A * 3/1994 Okazaki et al. ............... 257/100
(Continued)

FOREIGN PATENT DOCUMENTS
JP     04-305961 A    10/1992
(Continued)

*Primary Examiner* — Alan Cariaso
(74) *Attorney, Agent, or Firm* — Sughrue Mion, PLLC

(57) ABSTRACT

A light emitting module (12) is provided with a circuit board (20), a plurality of LED chips (21) mounted on a surface of the circuit board (20), and a plurality of lenses (30) covering the LED chips (21). The circuit board (20) is provided with a plurality of portions defining gate holes (27), which penetrate the circuit board from a front surface to a rear surface, and a runner (26), which is formed to pass on the portions defining the gate holes (27) on the rear surface side of the circuit board (20). The plurality of lenses (30) are formed on the front surface of the circuit board (20) by injection-molding a resin for the lens through the runner (26) and the portions defining the gate holes (27). Connecting sections (31) each integrated with corresponding one of the lenses (30) are formed in the portions defining the gate holes (27), and a supporting section (32) integrated with the connecting sections (31) is formed in the runner (26). At this time, a height of the supporting section (32) formed in the runner (26) is set at a height of the rear surface of the circuit board (20) or lower. Thus, mechanical stability of a cover member and the like arranged corresponding to a solid-state light emitting element is improved.

10 Claims, 12 Drawing Sheets

| U.S. PATENT DOCUMENTS | | | | |
|---|---|---|---|---|
| 5,438,487 | A * | 8/1995 | Schmid et al. | 362/545 |
| 6,822,269 | B2 * | 11/2004 | Horiuchi et al. | 257/100 |
| 7,180,240 | B2 * | 2/2007 | Noguchi et al. | 313/512 |
| 7,192,163 | B2 * | 3/2007 | Park | 362/294 |
| 7,227,194 | B2 * | 6/2007 | Ono | 257/100 |
| 2005/0128761 | A1 * | 6/2005 | Wu | 362/545 |

| FOREIGN PATENT DOCUMENTS | | |
|---|---|---|
| JP | 07-022653 A | 1/1995 |
| JP | 11-224063 A | 8/1999 |
| JP | 3088422 U | 6/2002 |
| JP | 2003-037293 A | 2/2003 |

* cited by examiner

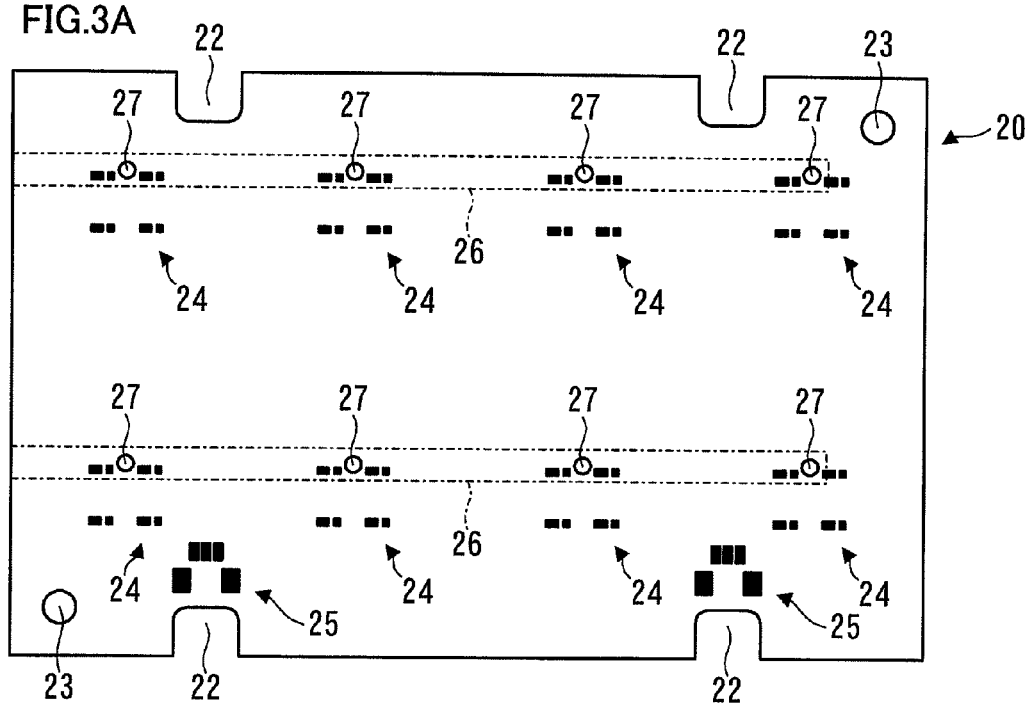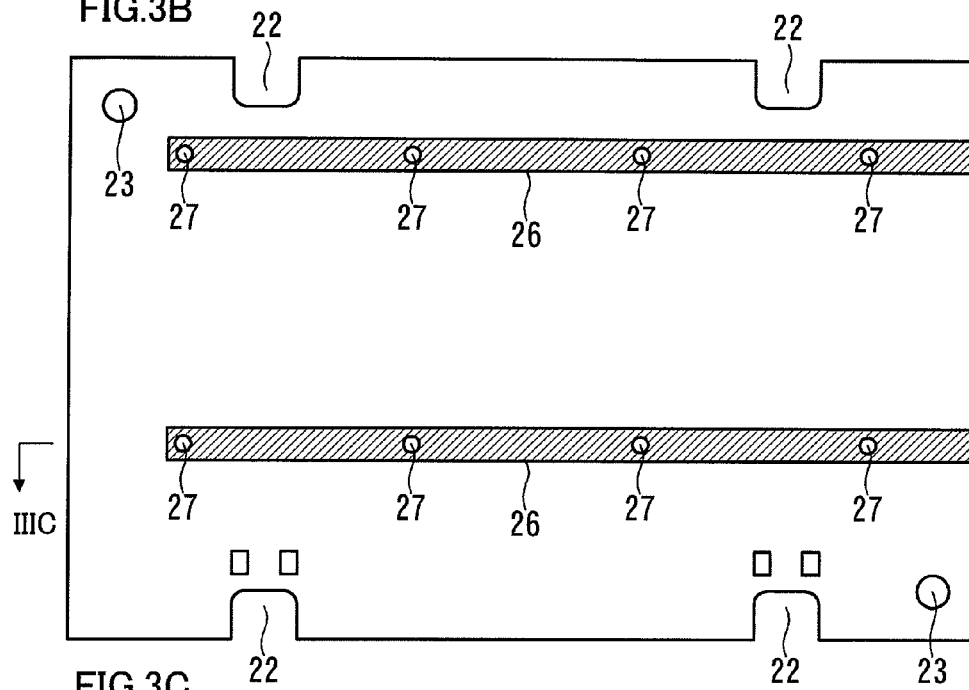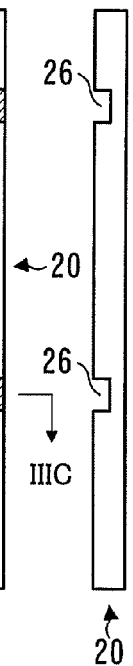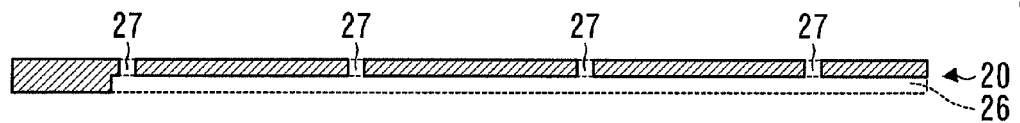

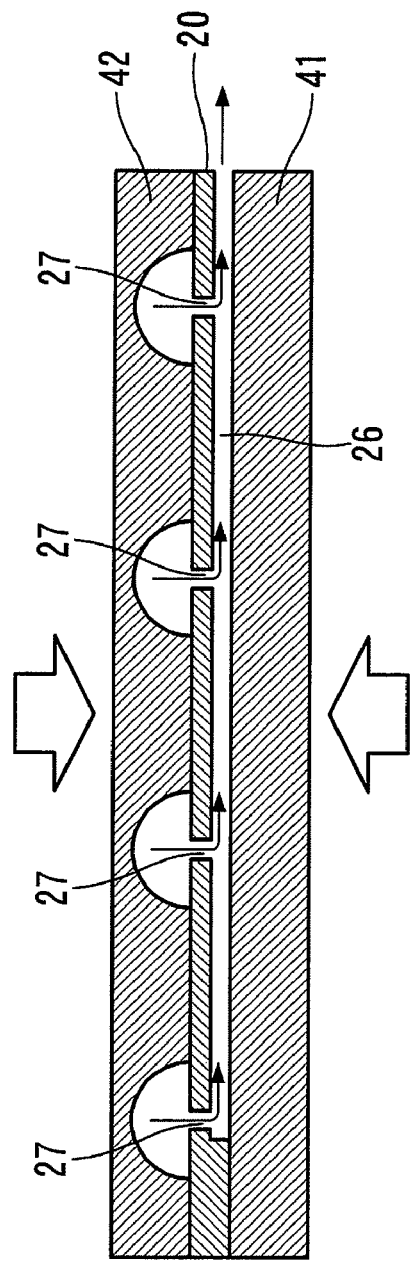
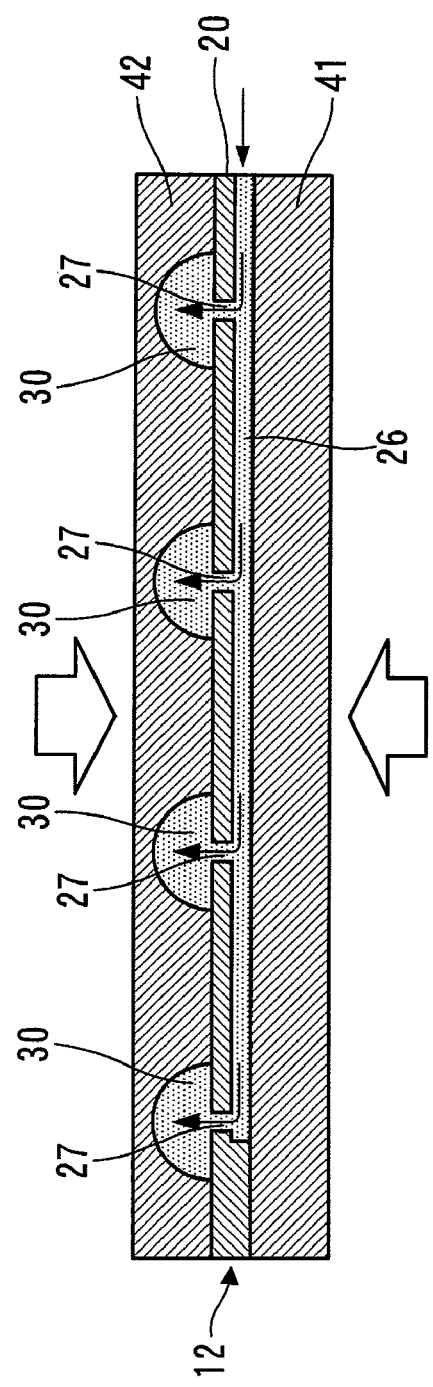

FIG.12A
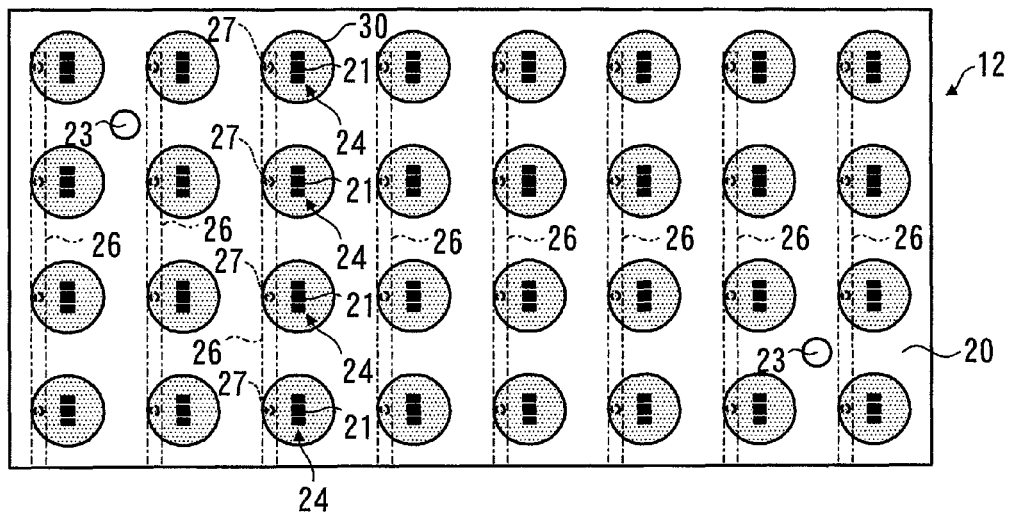
FIG.12B
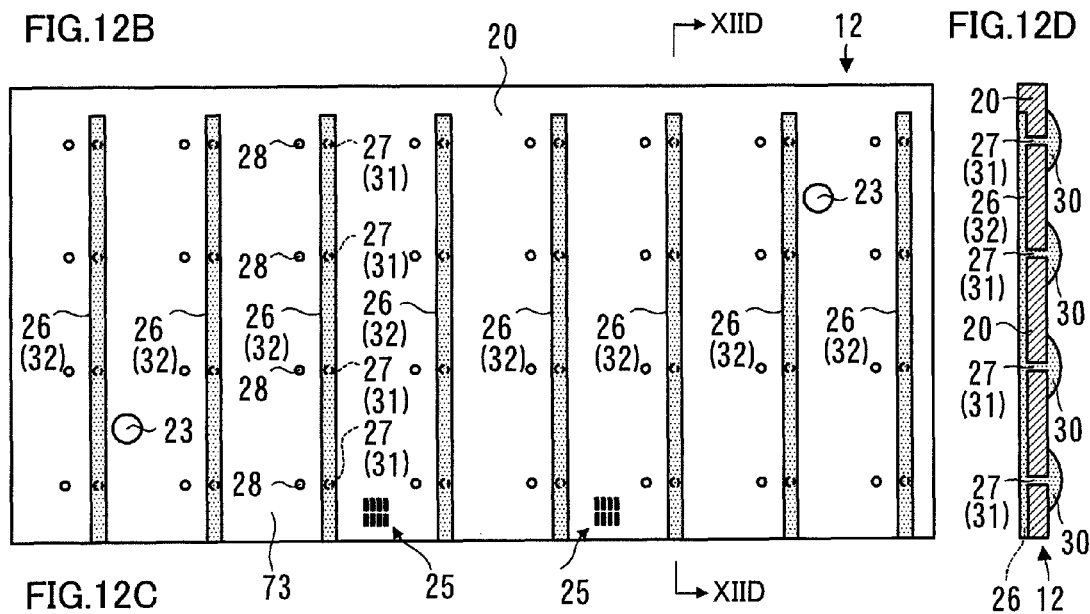
FIG.12C
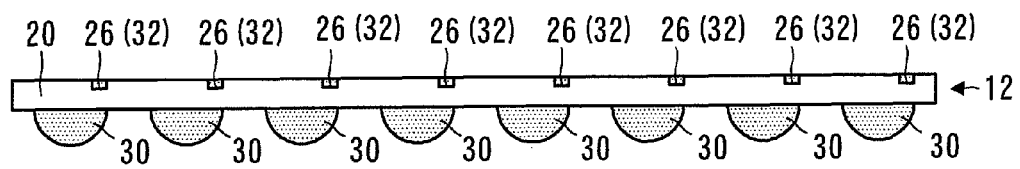
FIG.12D

LIGHT EMITTING APPARATUS, DISPLAY APPARATUS AND METHOD FOR MANUFACTURING LIGHT EMITTING APPARATUS

TECHNICAL FIELD

The present invention relates to a light emitting apparatus, a display apparatus and the like, and more specifically, it relates to a light emitting apparatus in which a solid-state light emitting element is included, and the like.

BACKGROUND ART

In recent years, various light emitting apparatuses in which solid-state light emitting elements such as light emitting diodes (LEDs) are used as a light source have come into practical use. Such light emitting apparatuses are widely used, for example, as a matrix display device in which a matrix of plural LEDs emits light selectively to display characters or images, a backlight for a liquid crystal panel of a liquid crystal display device, or the like.

In such a light emitting apparatus, each of the LEDs mounted on the board is covered with a transparent cover member, in most cases. The cover member is used, for example, to protect or seal the LED or to refract, in a desired direction, an optical path of light emitted from the solid-state light emitting elements.

Heretofore, there has been a proposal of a molding method for forming a lens-shaped cover for an LED mounted on a board. Specifically, the method includes forming a pair of portions defining penetration holes in the vicinity of the LED mounted on the board; and setting, on one surface of the board, an upper mold provided with a cavity in a predetermined form of lens for the mounted LED, and on the other surface thereof, a lower mold provided with a different cavity serving as a pouring basin corresponding to the cavity. The method includes then injecting a molding resin from the different cavity provided in the lower mold into the cavity in the form of lens via the portions defining the penetration holes; and subsequently forming the cover over the LED (for example, refer to Patent Document 1).

Patent Document 1: Japanese Patent Application Laid Open Publication No. 7-22653

DISCLOSURE OF THE INVENTION

Problems to be Solved by the Invention

Incidentally, in the light emitting apparatus obtained in this manner, the resin formed on the rear surface of the board after the molding protrudes from a bottom, the bottom being the rear surface of the board. Thus, for example, if a shock is given to the rear surface of the board for any reason, the resin formed on the rear surface of the board may possibly be cut off from the resin formed in the portions defining the penetration holes. Then, when the resin formed on the rear surface of the board is cut off from the resin formed in the portions defining the penetration holes, the cover in the form of lens loses a support therefor and becomes detached from the surface of the board. As a result, the cover does not serve its function as the cover for the LED.

Also, a general LED is designed so that a semiconductor itself emits light, and thus, the LED does not present the problem of an incandescent lamp, such as a broken filament. However, a deterioration in the LED or the resin constituting the cover for the LED causes a decrease in light transmittance, and hence a gradual deterioration in luminance. Moreover, it is known that the deterioration in the resin speeds up under the influence of heat produced by the LED. In particular, for the backlight for the liquid crystal display device, a blue LED of short wavelength may be used, light with a shorter wavelength from an LED has higher energy, and thus a more rapid deterioration in the resin occurs. Also, an attempt to increase the supply of current to the LED in order to keep a display screen bright leads to higher light intensity, and in turn to higher temperature of the LED, and thus a notable deterioration in the resin occurs.

In order to deal with the above problems, a radiator may be laminated for example on the rear surface of the board thereby to improve heat radiation characteristics of the board.

However, in case of a resin projecting from the rear surface of the board, it is difficult to enhance adhesion between the rear surface of the board and the radiator. As a result, heat radiation performance is degraded and thus the deterioration in the resin constituting the cover cannot be suppressed.

The present invention has been made in order to address the foregoing technological problems. An object of the present invention is to improve mechanical stability of a cover member or the like provided correspondingly for a solid-state light emitting element.

Also, another object of the present invention is to ensure the heat radiation performance of the board, when the cover member or the like is formed for the solid-state light emitting element mounted on the board.

Means for Solving the Problems

In order to achieve the above objects, there is provided a light emitting apparatus to which the present invention is applied, including: a board in which a portion defining a penetration hole penetrating from one surface to the other surface is formed, and that has a recess, in the other surface, in a region where the portion defining the penetration hole is formed; a solid-state light emitting element that is mounted on the one surface of the board; a cover member that covers the solid-state light emitting element mounted on the one surface of the board; a connecting section connected to the cover member via the portion defining the penetration hole; and a supporting section that is formed in the recess provided in the other surface of the board, and that supports the cover member through the connecting section since being connected to the connecting section.

In the light emitting apparatus described above, in the recess, the supporting section is formed at or below a height of the other surface. Further, in the other surface of the board, a metal layer, and the recess formed by removing the metal layer are provided. In this configuration, the board further includes a portion defining a through hole obtained by forming a metal film on an inner wall of a portion defining a different penetration hole formed at a position where the solid-state light emitting element is mounted, and the portion defining the through hole is connected to the metal layer provided on the other surface of the board. Furthermore, a plurality of the solid-state light emitting elements are mounted on the one surface of the board, the board is provided with a plurality of the portions defining the penetration holes corresponding to the plurality of solid-state light emitting elements, and the recess provided in the other surface of the board is formed so as to pass on at least two positions which each have the portion defining the penetration hole formed therein. Still furthermore, an end of the recess is exposed on a side of an end of the board.

From another aspect of the present invention, there is provided a display apparatus including a display panel for image display and a backlight facing toward a back side of the display panel and irradiating the display panel with light from the back side of the display panel. The backlight includes: a board in which a portion defining a penetration hole penetrating from one surface to the other surface is formed, and that has a recess, in the other surface, in a region where the portion defining the penetration hole is formed; a solid-state light emitting element that is mounted on the one surface of the board; a molded member that is formed by integrally molding a protecting section protecting the solid-state light emitting element mounted on the one surface of the board, a connecting section provided in the portion defining the penetration hole and connected to the protecting section, and a supporting section provided in the recess formed in the other surface of the board, the supporting section being connected to the connecting section; and a heat radiation member that is disposed in contact with the other surface of the board, and that radiates heat produced in the board.

In the display apparatus described above, the supporting section of the molded member is set at or below a height of the other surface of the board. Further, in the other surface of the board, a metal layer, and the recess formed by removing the metal layer are provided. In this configuration, the board further includes a portion defining a through hole obtained by forming a metal film on an inner wall of a portion defining a different penetration hole formed at a position where the solid-state light emitting element is mounted, and the portion defining the through hole is connected to the metal layer provided on the other surface of the board. Furthermore, a plurality of the solid-state light emitting elements are mounted on the one surface of the board, the board is provided with a plurality of the portions defining the penetration holes corresponding to the plurality of solid-state light emitting elements, and the recess provided in the other surface of the board is formed so as to pass on at least two positions which each have the portion defining the penetration hole formed therein. Still furthermore, an end of the recess is exposed on a side of an end of the board.

From further aspect of the present invention, there is provided a method for manufacturing a light emitting apparatus, including: mounting a solid-state light emitting element on one surface of a board having a portion defining a penetration hole penetrating from the one surface to the other surface, and having a recessed runner formed in the other surface such that the runner passes on a position where the portion defining the penetration hole is formed; and forming a cover to cover the solid-state light emitting element, by injecting a resin from the runner formed in the other surface of the board via the portion defining the penetration hole into a space around the solid-state light emitting element mounted on the one surface of the board.

In this case, in the forming of the cover, the resin is injected to a depth equal to or less than a depth of the runner. Further, an end of the runner is formed so as to be exposed on a side of an end of the board, and, in the forming of the cover, the resin is injected from the side of the end of the board into the runner.

Advantages of the Invention

According to the present invention, it is possible to improve mechanical stability of a cover member or the like provided correspondingly for a solid-state light emitting element.

Also, according to the present invention, it is possible to ensure the heat radiation performance of the board, when the cover member or the like is formed for the solid-state light emitting element mounted on the board.

BRIEF DESCRIPTION OF THE DRAWINGS

FIGS. 3A to 3D show the configuration of the circuit board of the light emitting module according to the first exemplary embodiment;

FIGS. 7A and 7B are views of assistance in explaining process of forming the lenses on the circuit board;

FIGS. 9A to 9D are views showing the configuration of the circuit board of the light emitting module according to the second exemplary embodiment;

FIGS. 12A to 12D are views showing the configuration of the light emitting module according to the second exemplary embodiment.

BEST MODES FOR CARRYING OUT THE INVENTION

Hereinafter, exemplary embodiments of the present invention will be described in detail with reference to the accompanying drawings.

First Exemplary Embodiment

Figure 1:
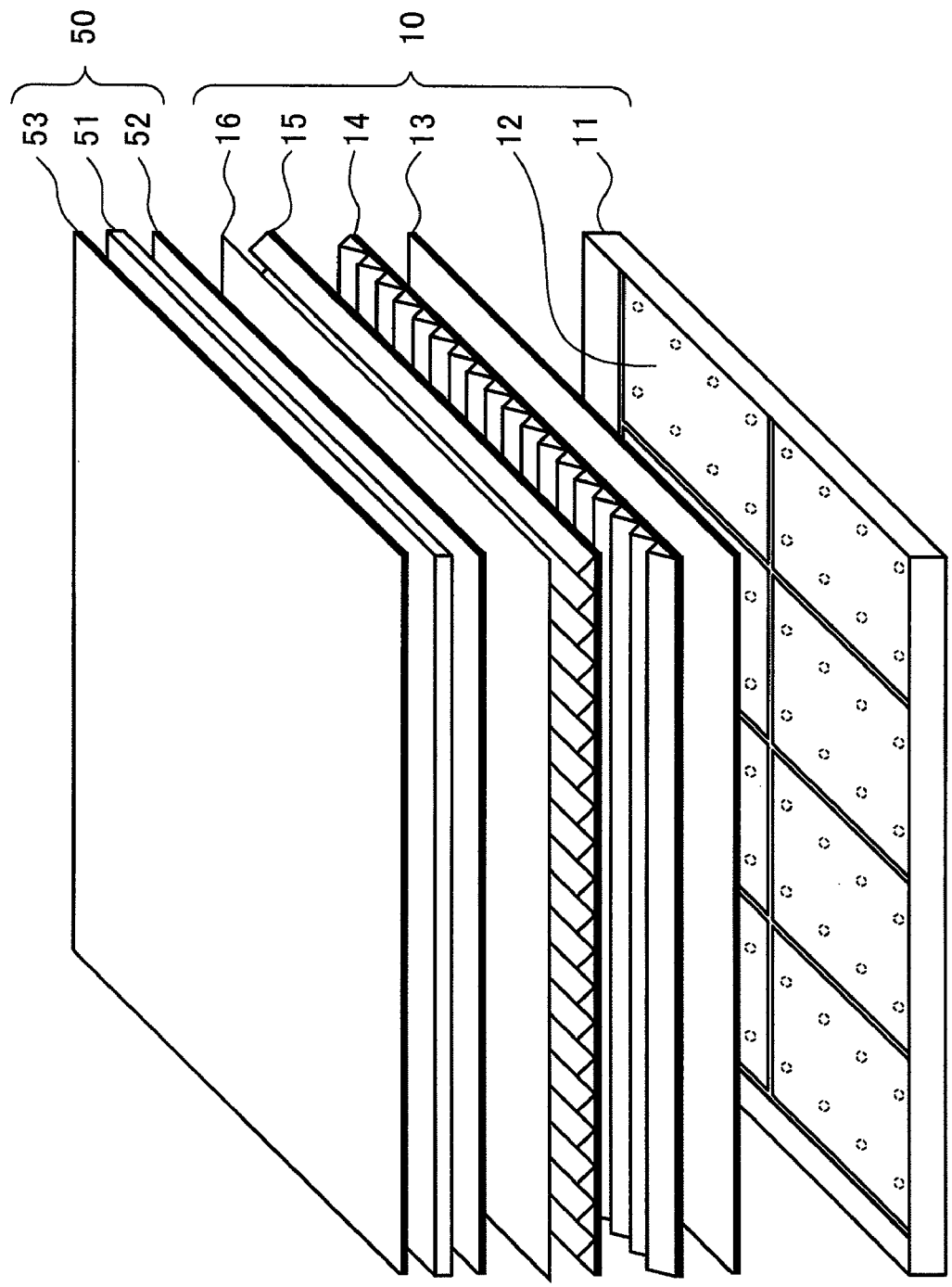
FIG. 1 is a view showing an entire configuration of a liquid crystal display device.

FIG. 1 is a view showing an entire configuration of a liquid crystal display device to which the first exemplary embodiment is applied. The liquid crystal display device to which the first exemplary embodiment is applied includes a liquid crystal display module 50 and a backlight device 10 that is provided on a back surface of the liquid crystal display module 50 (a lower side in the FIG. 1).

The backlight device 10 includes a backlight frame 11 that contains a light emitting part, and a light emitting module 12 on which plural light emitting diodes (referred to as LEDs in the following description) are arrayed. Moreover, the backlight device 10 includes, as a laminated body of optical films, a diffusion plate 13 that is a plate (or a film) scattering and diffusing light to equalize the lightness over the entire surface, and prism sheets 14 and 15 as diffraction grating films that have a light collection effect to the front. In addition, the backlight device 10 includes a brightness improvement film 16 with a diffusion and reflection type, for improving the brightness.

On the other hand, the liquid crystal display module 50 includes a liquid crystal panel 51 as one type of a display panel that is constituted by two glass plates sandwiching liquid crystal in between, and polarization plates 52 and 53 for restricting the oscillation of optical wave to a given direction, which are each laminated on each glass plate of the liquid crystal panel 51. The liquid crystal display device includes peripheral members (not shown in the figure) such as an LSI (Large Scale Integration) for driving, mounted thereon.

The liquid crystal panel 51 includes various components not shown in the figure. For example, the two glass plates have display electrodes, active elements such as a thin film transistor (TFT), liquid crystal, a spacer, sealant, an orientation film, a common electrode, a protective film, a color filter, and others, none of which is shown in the figure.

Incidentally, the structural unit of the backlight device 10 is selected in an arbitrary way. For example, the unit including only the backlight frame 11 with the light emitting module 12 may be called as the "backlight device (backlight)" and distributed without including the laminated body of the optical films such as the diffusion plate 13 and the prism sheets 14 and 15.

Figure 2A:
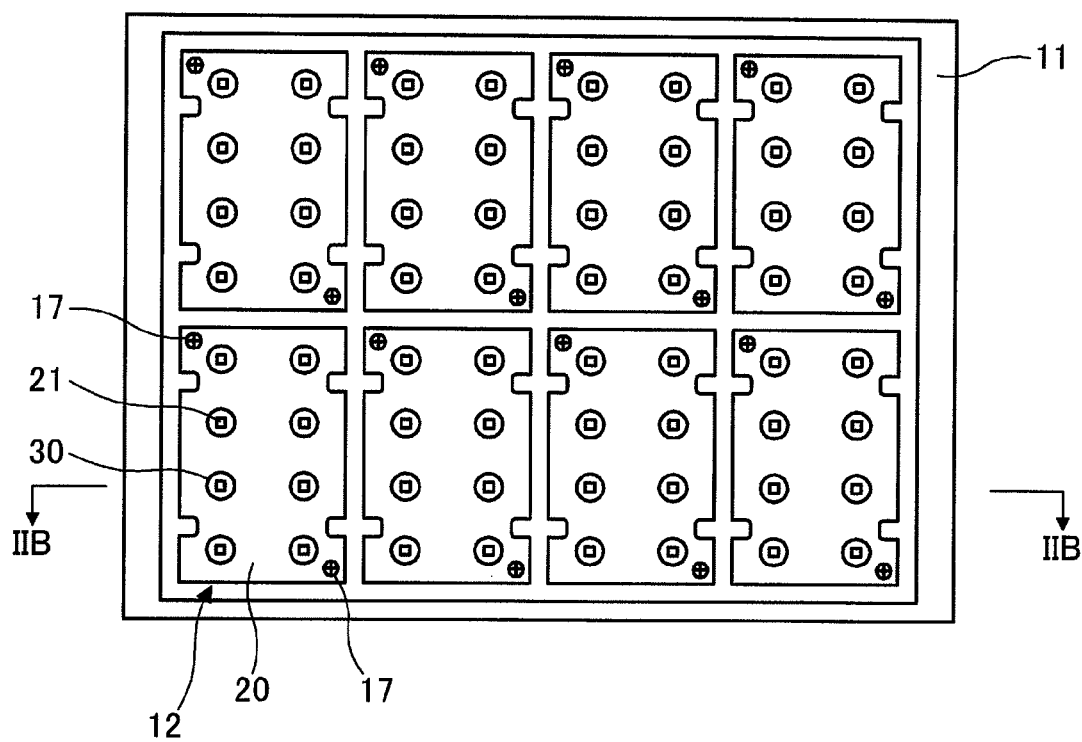
FIGS. 2A and 2B are views of assistance in explaining a partial structure of the backlight device.
Figure 2B:
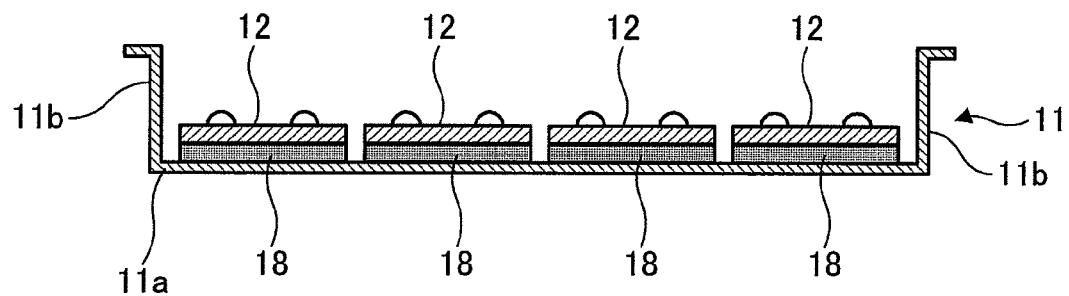

FIGS. 2A and 2B are views of assistance in explaining a partial structure of the backlight device 10. Specifically, FIG. 2A is a top view of the backlight frame 11 on which the light emitting modules 12 are mounted, which is seen from the liquid crystal display module 50 shown in FIG. 1, and FIG. 2B is a cross sectional view taken along a line IIB-IIB in FIG. 2A. In an instance shown in FIGS. 2A and 2B, a direct-lighting type backlight configuration is adopted in which light sources are disposed directly beneath the back surface of the liquid crystal display module 50. In this backlight configuration, LED chips are arrayed in such a manner that they are almost uniformly distributed with respect to the entire back surface of the liquid crystal display module 50. Therefore, the configuration is different from a side-lighting type backlight configuration in which light sources are disposed on one or two sides of the light guiding plate so that uniform light on a plane surface is obtained by a reflection plate and a light guiding plate.

The backlight frame 11 has a chassis structure made of, for example, aluminum, magnesium, iron, or a metallic alloy including these materials. To the inside of the chassis structure, a polyester film or the like having a high performance of reflecting white light is adhered, for example. It also functions as a reflector. The chassis structure is composed of a rear portion 11a corresponding to the size of the liquid crystal display module 50 and side portions 11b enclosing the four sides of the rear portion 11a. On the rear portion 11a, a heat radiation sheet 18 may be provided.

In an instance shown in FIGS. 2A and 2B, there are provided plural light emitting modules 12 (e.g., eight light emitting modules 12 as employed in this instance) as an example of a light emitting apparatus. Then, the light emitting modules 12 are each fixed to the backlight frame 11 by plural screws 17 (e.g., two screws 17 for each light emitting module 12, as employed in this instance) through the heat radiation sheet 18. Incidentally, a silicone rubber sheet having a multilayer structure with, for example, insulating properties may be used as the heat radiation sheet 18.

The light emitting module 12 includes a circuit board 20, and plural LED chips 21 (e.g., eight LED chips, as employed in this instance) mounted on the circuit board 20. The plural LED chips 21 as one type of solid-state light emitting elements, are formed of red, green and blue LEDs that emit red light, green light and blue light, respectively, and the red, green and blue LED chips 21 are arranged in accordance with a given rule. Mixing of light emitted from the red, green and blue LED chips 21 achieves a light source having a wide range of color reproduction. Incidentally, each of the LED chips 21 may include one or more LEDs that each emit red, green or blue light, or a pseudo-white solid-state light emitting element that emits pseudo white light by a combination of, for example, a single LED that emits blue-violet light and a YAG phosphor. Further, the LED chip 21 may be configured to include plural LEDs that emit red, green and blue light, respectively, and combines them so as to emit white light. When the plural light emitting modules 12 are mounted on the backlight frame 11, the LED chips 21 are uniformly disposed throughout the structure of the backlight. Utilization of the entire LED chips 21 present on the backlight frame 11 provides a backlight device 10 that achieves the uniformity of brightness and chromaticity. Incidentally, in an instance shown in FIGS. 2A and 2B, the plural light emitting modules 12 are provided; however, all LED chips 21 to be used as a light source of the backlight may be collectively combined into one board of a single light emitting module 12.

Each individual LED chip 21 disposed on the light emitting module 12 is provided with a lens 30. The lens 30 functioning as a cover member, a protector or a cover is fixed so as to cover each individual LED chip 21. Each lens 30 has functions of protecting each LED chip 21 and also efficiently and uniformly guiding light emitted from the corresponding LED chip 21 to the liquid crystal display module 50 (refer to FIG. 1).

FIGS. 3A to 3D show the configuration of the circuit board 20 of the light emitting module 12. Specifically, FIG. 3A is a top surface view of the circuit board 20 on which the LED chips 21 are mounted; FIG. 3B is a rear surface view of the circuit board 20; FIG. 3C is a sectional view taken along the line IIIC-IIIC of FIG. 3B; and FIG. 3D is a side view of the circuit board 20 as viewed from the direction of its width. Incidentally, FIGS. 3A to 3D show the circuit board 20 alone without the LED chips 21 or the lenses 30 mounted thereon.

The circuit board 20 includes a circuit (not shown in the figure) by which electric power and signals are fed to the LED chips 21 mounted on the circuit board 20. The circuit board 20 has a rectangular shape, and has two cutouts 22 formed therein on each long side of a rectangle. In the first exemplary embodiment, what is called an aluminum board, which is made of an aluminum based material, is used as the circuit board 20. Also, the circuit board 20 is provided with portions defining two screw holes 23 for the above-mentioned screws 17.

Groups of lands 24 for providing electrical connections to the LED chips 21 to be mounted, respectively, are formed on the top surface of the circuit board 20 (or on one surface thereof). The circuit board 20 is configured to mount a total of eight LED chips 21 in a matrix with four columns in the direction of the length of the circuit board 20 and two rows in the direction of the width thereof, and eight groups of lands 24 are likewise provided correspondingly for the eight LED chips 21, respectively. Also, two groups of terminals 25 providing electrical connections to an external power supply (not shown) are provided on the top surface of the circuit board 20 in the vicinity of the cutouts 22 shown in the lower part of FIG. 3A.

Also, two runners 26 are formed along the direction of the length of the circuit board 20 in the rear surface of the circuit board 20 (or in the other surface thereof). These two runners 26 in a form of recess are formed by cutting out the portion of the circuit board 20 in the direction of its thickness. The two runners 26 are each provided so as to extend under the formed positions of four groups of lands 24 (or the mounted positions of the LED chips 21) on the top surface of the circuit board 20. Then, the runners 26 are configured so that one end of each runner 26 is exposed at a side of one end of the circuit board 20 as shown in FIG. 3D, but the other end of each runners 26 is not exposed at a side of the other end of the circuit board 20. However, it is to be understood that this is illustrative only, and the runners 26 may be formed so as to extend through both end faces of the circuit board 20.

Further, the runners 26 are each provided with four portions defining gate holes 27 penetrating the circuit board 20 from the top surface to the rear surface thereof. The position where each portion defining the gate hole 27 as a portion defining a penetration hole is formed is in the vicinity of the center of each group of lands 24 provided on the top surface of the circuit board 20. It is to be noted that the formed positions of the portions defining the gate holes 27 are such that the portions defining the gate holes 27 are not blocked by the LED chips 21 when plural LED chips 21 are mounted on the circuit board 20.

Figure 4:
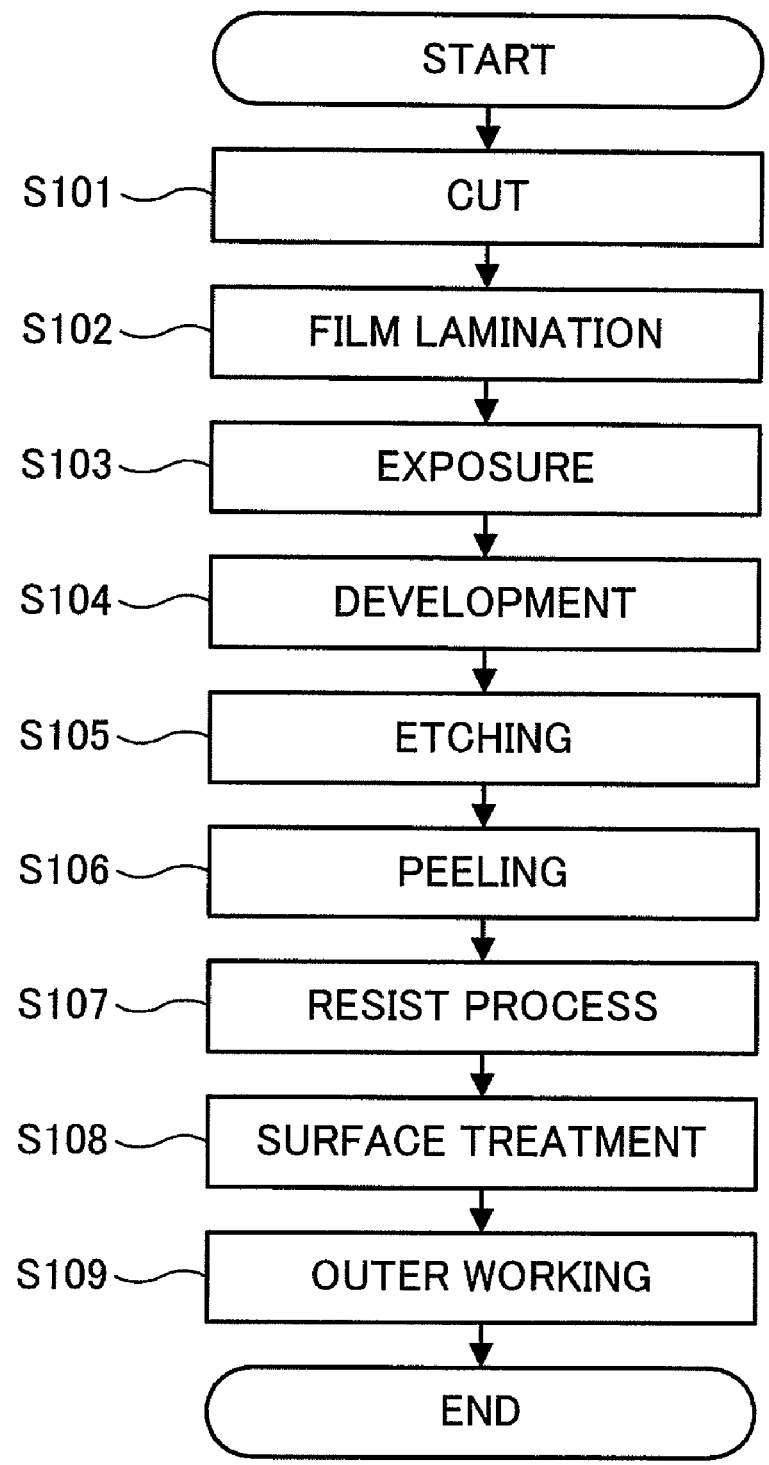
FIG. 4 is a flowchart showing a manufacturing method of the circuit board according to the first exemplary embodiment.

A manufacturing method of the circuit board 20 will be described with reference to FIG. 4 and FIGS. 5A to 5I. FIG. 4 is a flowchart showing a manufacturing method of the circuit board 20 according to the first exemplary embodiment, and FIGS. 5A to 5I are views of assistance in explaining specific processes in steps in the flowchart shown in FIG. 4.

Figure 5A:
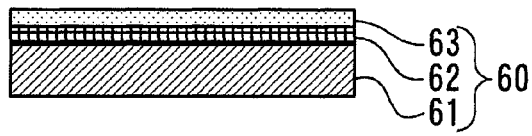
FIGS. 5A to 5I are views of assistance in explaining specific processes in manufacturing steps of the circuit board according to the first exemplary embodiment.

First, a board 60 is prepared as a base for the circuit board 20, and is cut to a size useable by a manufacturing apparatus or the like (step S101). As shown in FIG. 5A, the board 60 as prepared here includes an aluminum base 61 made of aluminum, an insulating layer 62 formed on one surface of the aluminum base 61 throughout its entire area, and copper foil 63 formed on the insulating layer 62 throughout its entire area.

Figure 5B:
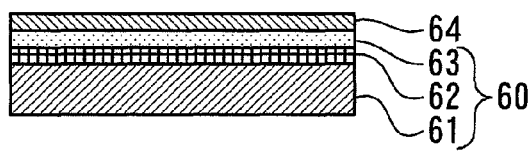

Then, the board 60 cut to the desired size undergoes film lamination (step S102). Specifically, as shown in FIG. 5B, a photoconductive dry film 64 having the function as a resist is laminated onto the copper foil 63 of the board 60. Here, it may be safely said that various types may be selected as the photoconductive dry film 64 from among types having various properties; however, the photoconductive dry film 64 that functions as a negative resist is used in the first exemplary embodiment.

Figure 5C:
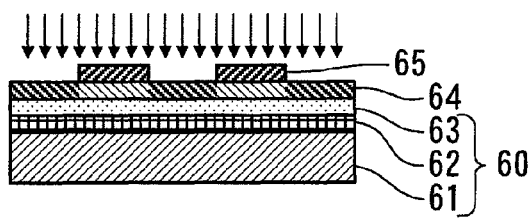

Then, exposure is performed on the board 60 having the photoconductive dry film 64 laminated thereto (step S103). Specifically, as shown in FIG. 5C, a mask 65 formed corresponding to a circuit pattern is made to have close contact with the photoconductive dry film 64 laminated to the board 60, and the board 60 is irradiated with ultraviolet light from above the mask 65. In the first exemplary embodiment, the mask 65 is designed so as to cover the entire area exclusive of an area to be left as a circuit. Then, the area of the photoconductive dry film 64 covered with the mask 65 is not subjected to the ultraviolet irradiation, and thus maintains its properties as they are. Meanwhile, the area of the photoconductive dry film 64 not covered with the mask 65 changes in its properties under the ultraviolet irradiation. Thus, a latent image is formed on the exposed photoconductive dry film 64 according to the presence or absence of the ultraviolet irradiation.

Figure 5D:
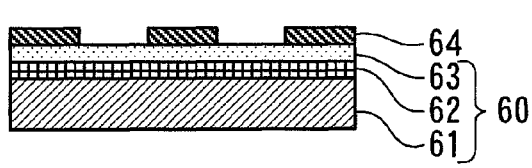

Then, the exposed photoconductive dry film 64 on the board 60 is developed (step 104). Specifically, a developing solution is fed to the exposed photoconductive dry film 64 on the board 60, thereby developing the latent image formed on the photoconductive dry film 64. The photoconductive dry film 64 functioning as the negative resist is employed in the first exemplary embodiment as mentioned above. The negative resist is soluble in the developing solution in its original state but is insoluble in the developing solution in the part irradiated with the ultraviolet light in the exposure processing. Therefore, in the development, the area of the photo conductive dry film 64 not irradiated with the ultraviolet light is removed and thereby the copper foil 63 is exposed, as shown in FIG. 5D. On the other hand, the area of the photoconductive dry film 64 irradiated with the ultraviolet light maintains a state of covering the copper foil 63 even after the development. Incidentally, if the photoconductive dry film 64 of an alkali development type is used, a sodium carbonate aqueous solution, for example, may be used as the developing solution.

Figure 5E:
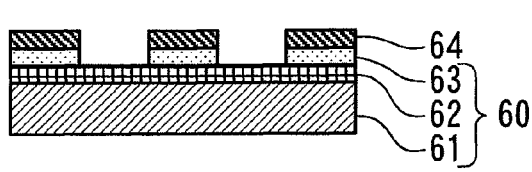

Further, the board 60 having the developed photoconductive dry film 64 is subjected to etching (step 105). Specifically, an area of the copper foil 63 exposed on the board 60 by the development is chemically dissolved by use of an etchant. As a result of the etching, a circuit pattern obtained by selectively dissolving the copper foil 63 on the insulating layer 62 is formed on the board 60 as shown in FIG. 5E. Incidentally, a ferric chloride aqueous solution or a cupric chloride aqueous solution, for example, may be used as the etchant.

Figure 5F:
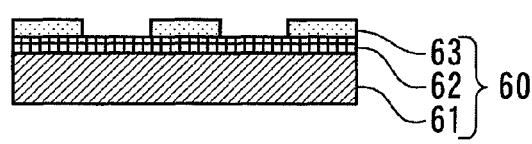

Then, the photoconductive dry film 64 laminated on the etched board 60 is peeled off and removed (step 106). Specifically, as shown in FIG. 5F, a peeling solution is fed to the photoconductive dry film 64 laminated on the copper foil 63 of the board 60, and thereby, the photoconductive dry film 64 is removed from the copper foil 63. As a result of peeling, a circuit pattern obtained by selectively etching the copper foil 63 is exposed on the top of the board 60. Incidentally, a sodium hydroxide aqueous solution, for example, may be used as the peeling solution.

Figure 5G:
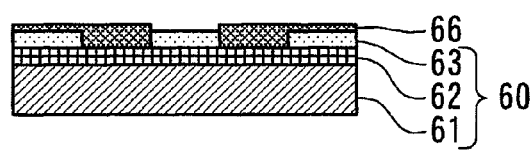

Then, the board 60 after the peeling is subjected to a resist process (step 107). Specifically, as shown in FIG. 5G, a resist layer 66 made of a resin is formed on the top of the board 60, that is, on the surface on which the circuit pattern made of the copper foil 63 is formed. Incidentally, at this time, the resist layer 66 is not formed in portions to be used in soldering or the like, such as the groups of lands 24 and the groups of terminals 25 shown in FIG. 3A (see the copper foil 63 shown in the central part of FIG. 5G). In the first exemplary embodiment, a screen printing approach, for example, may be used to selectively form the resist layer 66 on the board 60. Incidentally, for example, a thermosetting resist or a UV cure resist may be used to form the resist layer 66.

Figure 5H:
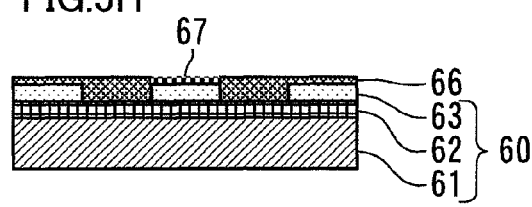

Then, the board 60 subjected to the resist process is subjected to surface treatment (step 108). Specifically, as shown in FIG. 5H, a plated silver layer 67 is formed by applying electroless silver plating to the area in which the resist layer 66 is not formed in the above step 107 and the copper foil 63, that is, the circuit pattern is exposed. Incidentally, a step of forming, for example, symbols and addresses of components, the name of the completed circuit board 20, or the like on the resist layer 66, by silk printing may be inserted between the above step 107 and this step 108.

Figure 5I:
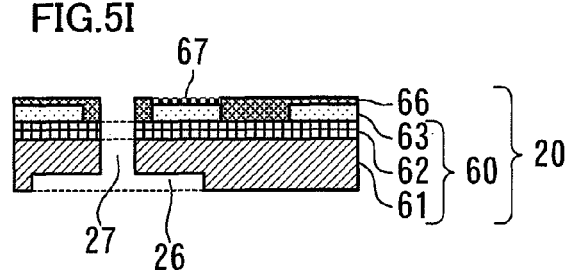

After that, the surface-treated board 60 is subjected to outer working (step 109). Incidentally, the outer working involves, for example, working for dimensions specified for the circuit board 20. Also, in the first exemplary embodiment, the portions defining the screw holes 23, the runners 26 and the portions defining the gate holes 27 shown in FIGS. 3A to 3D are worked. Thereby, the runners 26 and the portions defining the gate holes 27 are formed in the board 60 as shown in FIG. 5I.

After that, in an inspection process, the circuit board 20 obtained by working the board 60 undergoes checks for electrical continuity, broken lines, short circuits or the like of the circuit pattern, and an acceptable product is utilized as the circuit board 20.

Figure 6:
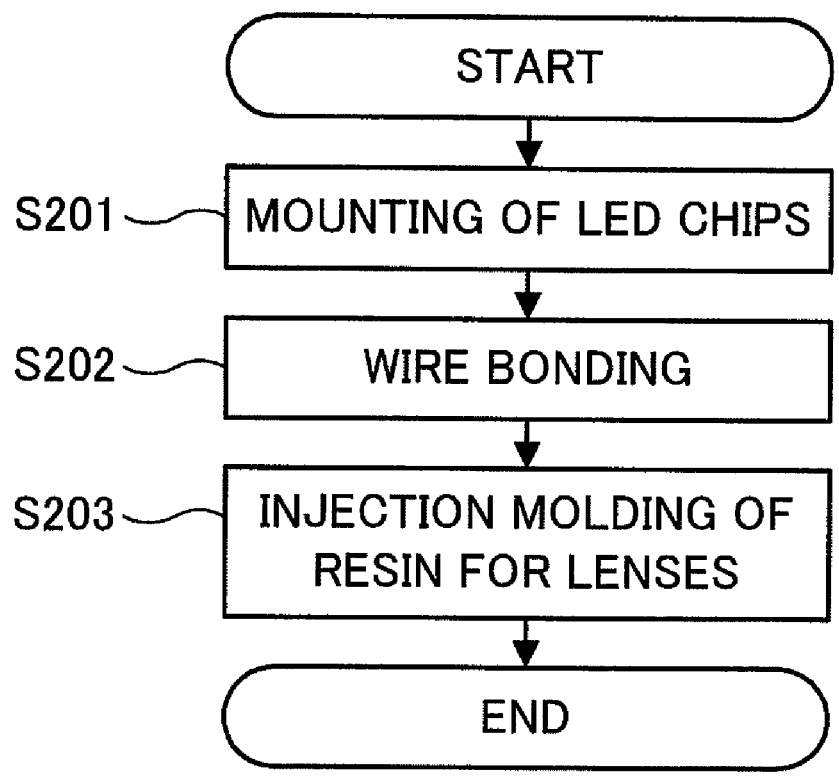
FIG. 6 is a flowchart showing a manufacturing method of the light emitting module using the circuit board.

Description will be given of a manufacturing method of the light emitting module 12 using the circuit board 20 obtained in this manner with reference to a flowchart shown in FIG. 6.

First, a required number of LED chips 21 (eight as employed in this instance) are mounted on the circuit board 20 (step S201). Incidentally, the LED chips 21 are mounted on corresponding locations (in the vicinity of the portions defining the gate holes 27) of the circuit board 20, respectively, for example, by bonding using an epoxy resin, a silicone resin, an acrylic resin or the like.

Then, electrodes provided for the LED chips 21 are bonded to the corresponding groups of lands 24, respectively, by wire bonding (step S202). This enables power supply to the LED chips 21, and thus enables the LED chips 21 to emit light.

Then, by injection molding of a resin for the lenses (step S203), the lenses 30 (see FIGS. 2A and 2B) corresponding to the LED chips 21 are formed, and consequently the step yields the light emitting module 12.

More detailed description will be given of the injection molding of the resin for the lenses at the above step S203.

FIG. 7A is a sectional view of the circuit board 20 in a setting state on an injection molding machine (not shown). Incidentally, an illustration of the LED chips 21 mounted on the circuit board 20 is omitted from FIG. 7A and FIG. 7B to be described later.

The injection molding machine sandwiches the circuit board 20 between lower and upper molding frames 41 and 42, while applying a predetermined force to the circuit board 20 by the lower and upper molding frames 41 and 42. Here, the lower molding frame 41 has the form of a flat plate, and the upper molding frame 42 has plural curved concavities each corresponding to the shape of the lens 30 to be formed. When the circuit board 20 is set on the injection molding machine, each of the runners 26 and the lower molding frame 41 form a space in the form of a rectangular solid, and also, a semispherical space is formed above each of the portions defining the gate holes 27 that communicate with the runners 26.

Then, the injection molding machine evacuates air present in these spaces by vacuuming. Then, after vacuuming is performed at a predetermined level, the injection molding machine starts injecting the resin for the lens into the spaces.

Here, a material having high light transmittance in the visible region, such as an epoxy resin, a polycarbonate resin, a silicone resin or an acrylic resin, may be used as the resin for the lens.

FIG. 7B is a sectional view of the circuit board 20 set on the injection molding machine, as being subjected to the injection of the resin for the lens. The resin for the lens injected from the one end of the circuit board 20 moves along the runner 26, through the portions defining the gate holes 27 and into the portions where the LED chips 21 (not shown) are attached. As a result, the semispherical lenses 30 are formed above the portions defining the gate holes 27. At this time, since vacuuming is performed in the spaces, the injected resin for the lens moves smoothly inside the spaces. When a predetermined amount of resin for the lens is injected, the injection of the resin for the lens is stopped, and the resin is held over a predetermined time. After that, the circuit board 20 having the lenses 30 attached thereto, that is, the light emitting module 12, is detached from the lower and upper molding frames 41 and 42.

Figure 8A:
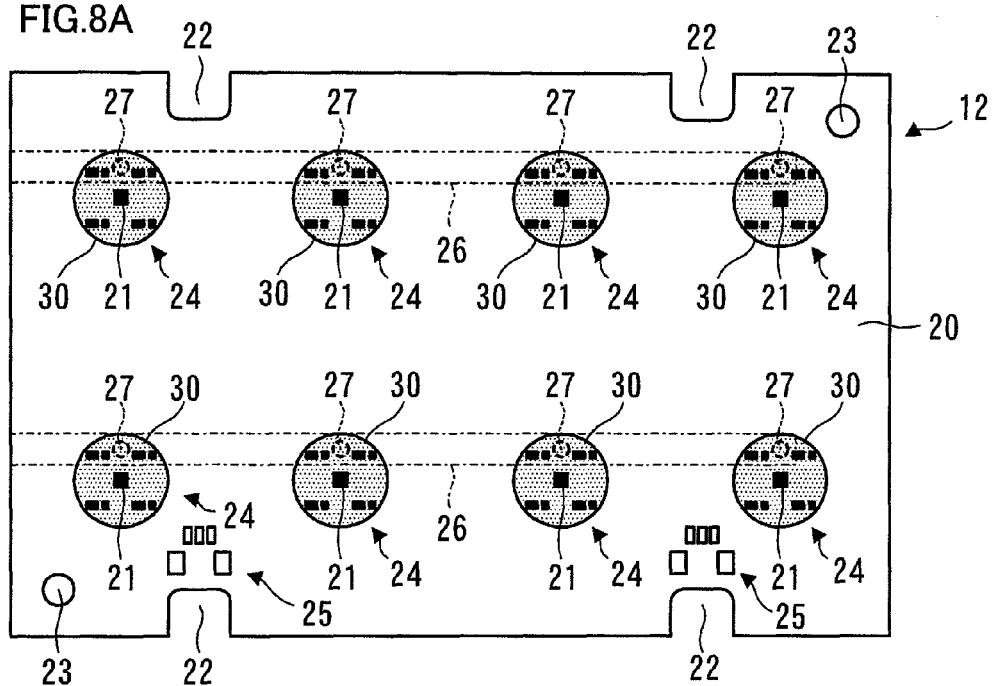
FIGS. 8A to 8D are views showing the configuration of the light emitting module according to the first exemplary embodiment.
Figure 8B:
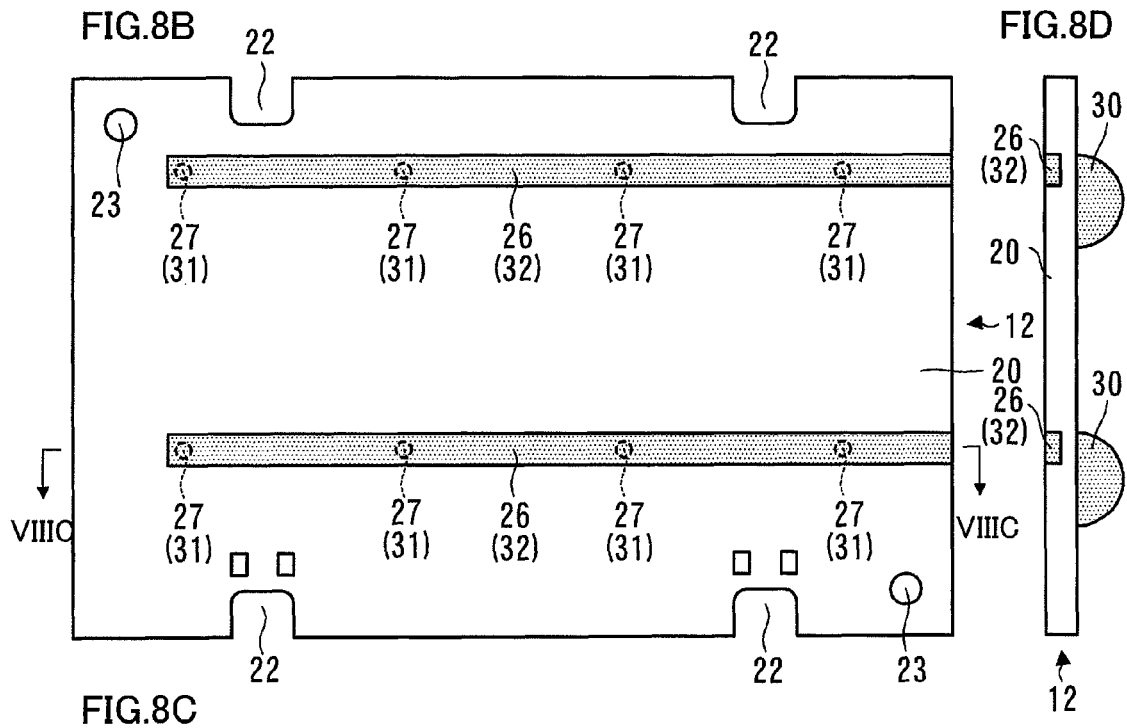
Figure 8D:
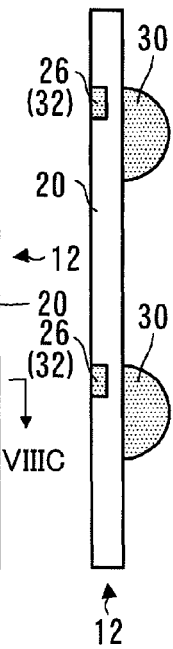
Figure 8C:
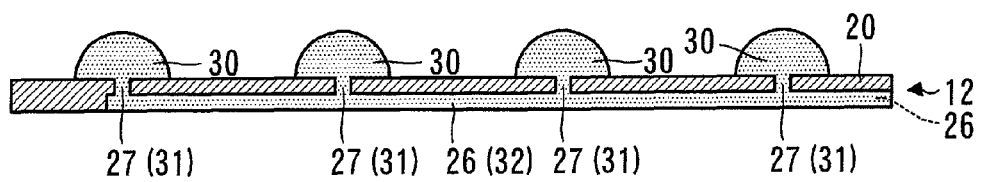

FIGS. 8A to 8D show the configuration of the light emitting module 12 obtained in this manner. Specifically, FIG. 8A is a top view of the light emitting module 12; FIG. 8B is a rear surface view of the light emitting module 12; FIG. 8C is a sectional view taken along the line VIIIC-VIIIC of FIG. 8B; and FIG. 8D is a side view of the light emitting module 12 as viewed from the direction of its width. Incidentally, an illustration of the LED chips 21 is omitted in FIGS. 8C and 8D.

The lenses 30 are formed on the top surface of the circuit board 20 that constitutes the light emitting module 12, that is, on the surface of the circuit board 20 on which the LED chips 21 are mounted, so as to cover the LED chips 21. The lenses 30 are each formed integrally with a connecting section 31 present in the portions defining the gate holes 27 and a supporting section 32 present in each runner 26 provided in the rear surface of the circuit board 20. In other words, the lenses 30 provided on the top surface of the circuit board 20 are supported by the supporting sections 32 provided on the rear surface of the circuit board 20, via the connecting sections 31. At this time, the supporting sections 32 are inside the runners 26 formed in the circuit board 20. Thus, the lenses 30 are fixed on the circuit board 20 (or the LED chips 21) with stability. Therefore, the first exemplary embodiment may suppress the occurrence of a situation where, for example, when a shock is given to the supporting section 32, a connection part to the connecting section 31 is broken and thus the lens 30 is detached from the circuit board 20. Incidentally, in the first exemplary embodiment, four lenses 30, four connecting sections 31 and one supporting section 32 function as a molding member.

Also, in the light emitting module 12, the supporting section 32 is configured so as to fill the runners 26, and the height of a portion thereof exposed on the rear surface of the circuit board 20 is the same as the height of the rear surface of the circuit board 20. In the first exemplary embodiment, the heat radiation sheet 18 is mounted on the rear surface of the light emitting module 12 including the circuit board 20, as described with reference to FIGS. 2A and 2B. Preferably, the light emitting module 12 and the heat radiation sheet 18 are in close contact with each other from the view point of an improvement in the heat radiation characteristics. In the light emitting module 12 according to the first exemplary embodiment, for example, as shown in FIGS. 8C and 8D, the height of the supporting section 32 is equal to or less than that of the rear surface of the circuit board 20, and the supporting section 32 does not project from the rear surface of the circuit board 20. Therefore, the aluminum base 61 (see FIGS. 5A to 5I) provided on the rear surface of the circuit board 20 that constitutes the light emitting module 12 may be brought into close contact with the heat radiation sheet 18. As a result, heat produced when the LED chips 21 provided on the light emitting module 12 are driven to emit light may escape to the backlight frame 11 through the aluminum base 61 and the heat radiation sheet 18, and this enables suppressing a rise in the temperature of the light emitting module 12.

Second Exemplary Embodiment

Description will be given with regard to another exemplary embodiment. The second exemplary embodiment is different from the first exemplary embodiment in the configuration of the circuit board 20 and an approach for forming the runner 26 in the circuit board 20.

Figure 9A:
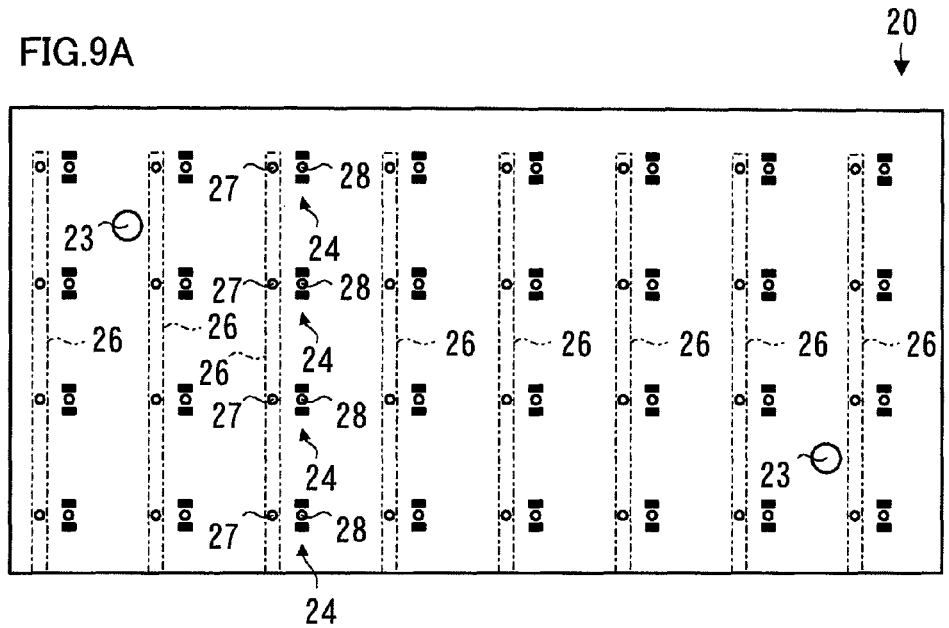
Figure 9B:
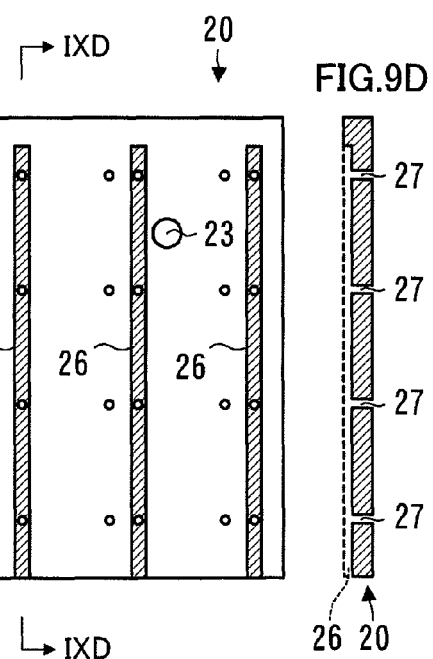
Figure 9C:
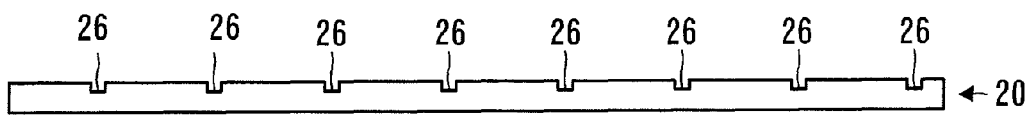

FIGS. 9A to 9D show the configuration of the circuit board 20 for use in the second exemplary embodiment. Specifically, FIG. 9A is a top surface view of the circuit board 20 on which the LED chips 21 are mounted; FIG. 9B is a rear surface view of the circuit board 20; FIG. 9C is a side view of the circuit board 20 as viewed from the direction of its length; and FIG. 9D is a sectional view taken along the line IXD-IXD of FIG.

9B. Incidentally, FIGS. 9A to 9D show the circuit board 20 alone, without the LED chips 21 and the lenses 30 mounted thereon, as in the case of the first exemplary embodiment.

The circuit board 20 includes a circuit (not shown) by which electric power and signals are fed to the LED chips 21 mounted on the circuit board 20. The circuit board 20 has a rectangular shape. In the second exemplary embodiment, what is called a glass-epoxy board, which is made of a glass-cloth base epoxy resin, is used as the circuit board 20. Also, the circuit board 20 is provided with two portions defining screw holes 23 for the screws 17.

Groups of lands 24 for providing electrical connections to the LED chips 21 to be mounted, respectively, are formed on the top surface of the circuit board 20. The circuit board 20 is configured so that a total of 32 LED chips 21 are mounted on the circuit board 20 in a matrix with eight columns in the direction of the length of the circuit board 20 and four rows in the direction of the width thereof, and 32 groups of lands 24 are likewise provided correspondingly for the 32 LED chips 21.

Also, eight runners 26 are formed at substantially equal intervals along the direction of the width of the circuit board 20 in the rear surface of the circuit board 20. Each of the eight runners 26 are provided so as to extend under a position where four groups of lands 24 are formed (or the mounted positions of the LED chips 21) on the top surface of the circuit board 20. Then, the runners 26 are configured so that one end of each of the runners 26 is exposed on a side of one end of the circuit board 20 as shown in FIG. 9C, but the other end of each of the runners 26 is not exposed on a side of the other end of the circuit board 20.

Further, the runners 26 are each provided with four portions defining gate holes 27 penetrating the circuit board 20 from the top surface to the rear surface thereof. The position where each portion defining the gate hole 27 is formed is adjacent to each group of lands 24 provided on the top surface of the circuit board 20. It is to be noted that the positions of the portions defining the gate holes 27 are such that the portions defining the gate holes 27 are not blocked by the plural LED chips 21 when plural LED chips 21 are mounted on the circuit board 20, as in the case of the first exemplary embodiment.

Further, the circuit board 20 is provided with 32 portions defining through holes 28 penetrating the circuit board 20 from the top surface to the rear surface thereof, at the mounting positions of the LED chips 21. The portions defining the through holes 28 are disposed adjacent to the corresponding portions defining the gate holes 27. Furthermore, two groups of terminals 25 that provides electrical connections to an external power supply (not shown) are provided on the rear surface of the circuit board 20, as shown in the lower part of FIG. 9B.

Figure 10:
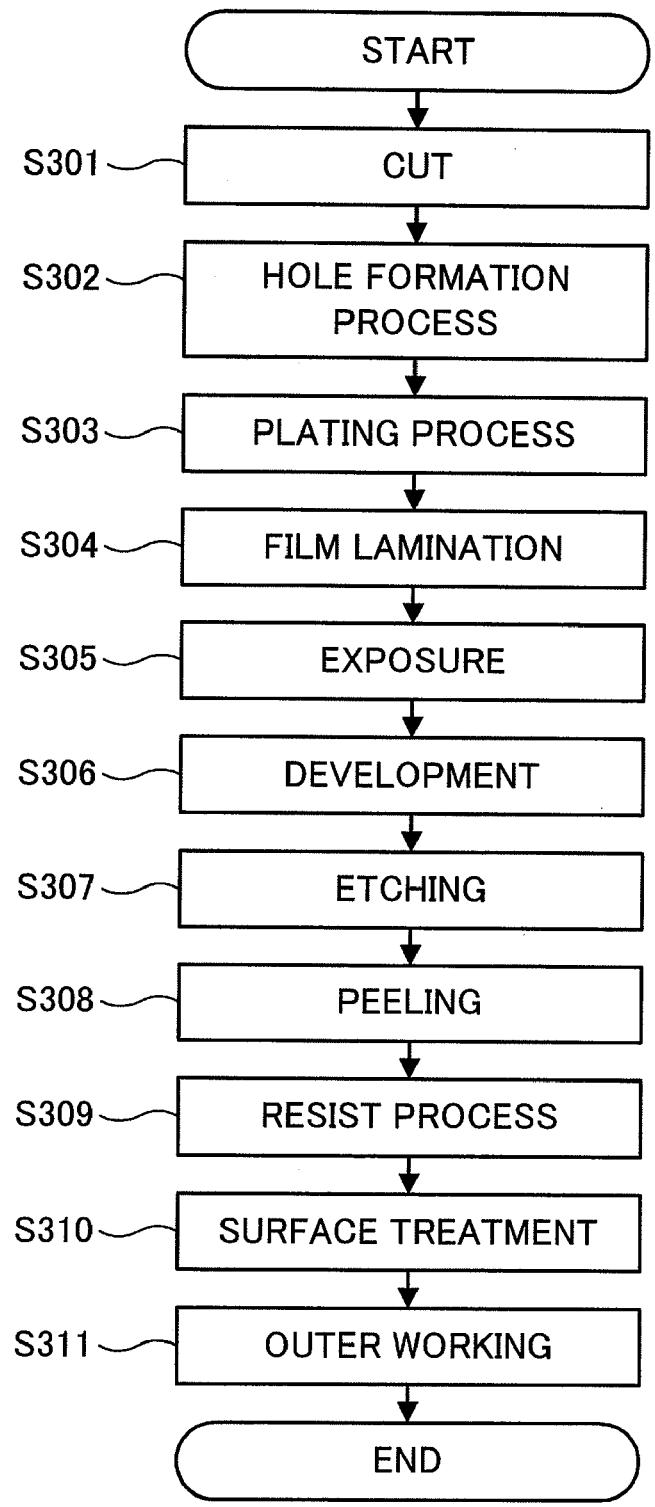
FIG. 10 is a flowchart showing the manufacturing method of the circuit board according to the second exemplary embodiment.

A manufacturing method of the circuit board 20 will be described with reference to FIG. 10 and FIGS. 11A to 11J. FIG. 10 is a flowchart showing the manufacturing method of the circuit board 20 according to the second exemplary embodiment, and FIGS. 11A to 11J are views of assistance in explaining specific processes in steps in the flowchart shown in FIG. 10.

Figure 11A:
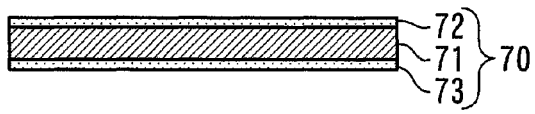
FIGS. 11A to 11J are views of assistance in explaining specific processes in manufacturing steps of the circuit board according to the second exemplary embodiment.

Also in this instance, first, a board 70 is prepared as a base for the circuit board 20, and is cut to a size useable by a manufacturing apparatus or the like (step S301). As shown in FIG. 11A, the board 70 as prepared here includes a glass-cloth base epoxy resin base 71 (hereinafter referred to as a "glass-epoxy base"), first copper foil 72 formed on one surface of the glass-epoxy base 71 (or on a top surface thereof) throughout its entire area, and second copper foil 73 formed on the other surface of the glass-epoxy base 71 (or on a rear surface thereof) throughout its entire area.

Figure 11B:
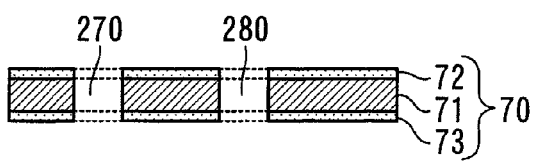

Then, the board 70 cut to the desired size is subjected to a hole formation process (step S302). Specifically, as shown in FIG. 11B, portions defining holes are formed in the board 70 in locations corresponding to the portions defining the gate holes 27 and the portions defining the through holes 28 by, for example, use of an NC hole formation apparatus or the like. As a result, portions defining penetration holes 270 corresponding to the portions defining the gate holes 27 and portions defining penetration holes 280 corresponding to the portions defining the through holes 28 are formed in the board 70.

Figure 11C:
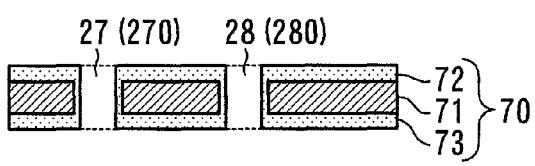

Then, the board 70 having the portions defining the penetration holes 270 and 280 formed therethrough is subjected to a plating process (step S303). Specifically, as shown in FIG. 11C, the inner walls of the portions defining the penetration holes 270 and 280 in the board 70 are subjected to electroless copper plating. By the electroless copper plating, copper is deposited on the inner walls of the portions defining the penetration holes 270 and 280, so that the first copper foil 72 and the second copper foil 73 are electrically connected at the formed areas of the portions defining the penetration holes 270 and 280. Incidentally, the portions defining the penetration holes 270 and 280 subjected to the electroless copper plating will be hereinafter called the portions defining the gate holes 27 and the portions defining the through holes 28, respectively. Incidentally, it is preferable that, in the step S303, a desmear process for removing the resin melted and cured during the hole formation process be performed before the electroless copper plating.

Figure 11D:
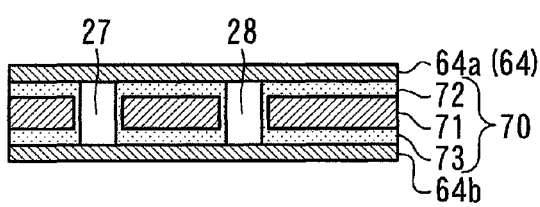

Then, the board 70 subjected to the electroless copper plating undergoes film lamination (step S304). In the second exemplary embodiment, the first copper foil 72 and the second copper foil 73 are respectively formed on both surfaces of the glass-epoxy base 71, and thus, as shown in FIG. 11D, photoconductive dry films 64 are laminated onto both surfaces of the board 70. Specifically, a first photoconductive dry film 64a is laminated onto the first copper foil 72, and a second photoconductive dry film 64b is laminated onto the second copper foil 73. Incidentally, the first photoconductive dry film 64a and the second photoconductive dry film 64b are laminated, and thereby the portions defining the gate holes 27 and the portions defining the through holes 28 are sealed.

Figure 11E:
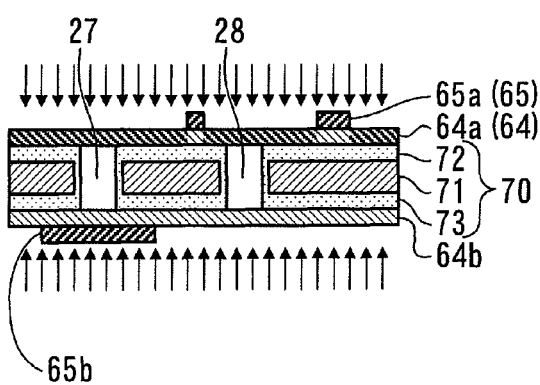

Then, exposure is performed on both surfaces of the board 70 having the photoconductive dry films 64 laminated thereto (step S305). Specifically, as shown in FIG. 11E, a first mask 65 formed corresponding to a circuit pattern is made to have close contact with the first photoconductive dry film 64a laminated to the top surface of the board 70, and the board 70 is irradiated with ultraviolet light from above the first mask 65a. On the other hand, a second mask 65b formed corresponding to the runners 26 (see FIGS. 9A to 9D) is made to have close contact with the second photoconductive dry film 64b laminated to the rear surface of the board 70, and the board 70 is irradiated with ultraviolet light from below the mask 65b. Incidentally, the second mask 65b is disposed so as to cover the portions defining the gate holes 27 formed in the board 70. Thus, latent images are formed on the exposed first and second photoconductive dry films 64a and 65b according to the presence or absence of the ultraviolet irradiation. Incidentally, it is preferable that there be a time lag between the exposures of both surfaces of the board 70.

Figure 11F:
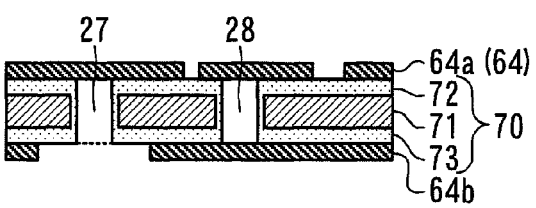

Then, the exposed photoconductive dry film 64 on the board 70 is developed (step 306). Similarly to the first exemplary embodiment, in the development, the area of the photoconductive dry film 64 (the first photoconductive dry film 64a and the second photoconductive dry film 64b) not irradiated with the ultraviolet light is removed and thereby the first copper foil 72 or the second copper foil 73 is exposed, as shown in FIG. 11F. On the other hand, the area of the photoconductive dry film 64 irradiated with the ultraviolet light maintains a state of covering the first copper foil 72 or the second copper foil 73 even after the development. At this time, on the rear side of the board 70, the portions defining the gate holes 27 are exposed.

Figure 11G:
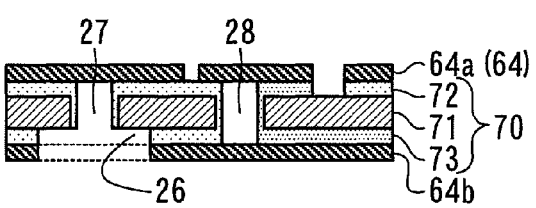
Figure 11H:
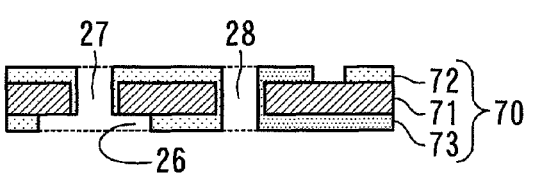

Further, the board 70 having the developed photoconductive dry film 64 is subjected to etching (step 307). As a result of the etching, a circuit pattern obtained by selectively dissolving the first copper foil 72 is formed on the top surface of the board 70 as shown in FIG. 11G. On the other hand, runners 26 obtained by selectively dissolving the second copper foil 73 is formed on the rear surface of the board 70.

Then, the first photoconductive dry film 64a and the second photoconductive dry film 64b laminated on the etched board 70 are peeled off and removed (step 308). As a result of peeling, a circuit pattern obtained by selectively etching the first copper foil 72 is exposed on the top surface of the board 70.

Figure 11I:
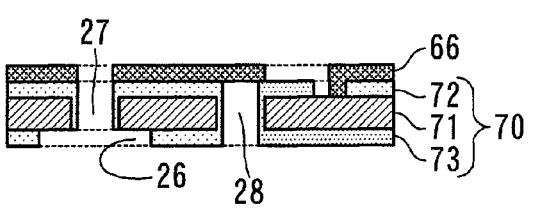

Then, the board 70 after the peeling is subjected to a resist process (step 309). Specifically, as shown in FIG. 11I, a resist layer 66 made of a resin is formed on the top surface of the board 70, that is, on the surface on which the circuit pattern made of the first copper foil 72 is formed. Incidentally, at this time, the resist layer 66 is not formed in portions to be used in soldering or the like, such as the groups of lands 24 shown in FIG. 9A (see the first copper foil 72 shown in the right part of FIG. 11I). In the second exemplary embodiment, the resist layer 66 is not formed on the portions defining the gate holes 27.

On the other hand, on the rear surface of the board 70, the resist layer 66 is not formed. That is, on the rear side of the board 70, the second copper foil 73 and the runners 26 are exposed.

Figure 11J:
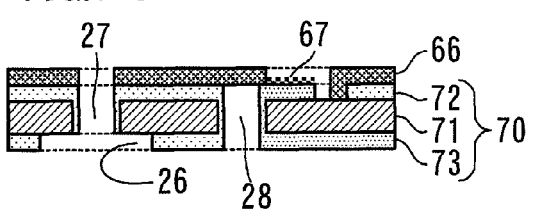

Then, the board 70 subjected to the resist process is subjected to surface treatment (step 310). Specifically, as shown in FIG. 11J, a plated silver layer 67 is formed by applying electroless silver plating to the area in which the resist layer 66 is not formed in the above step 309 and the first copper foil 72, that is, the circuit pattern is exposed. Incidentally, similarly to the first exemplary embodiment, a step of forming, for example, symbols and addresses of components, the name of the completed circuit board 20, or the like on the resist layer 66, by silk printing may be inserted between the above step 309 and this step 310.

After that, the surface-treated board 70 is subjected to outer working (step 311). Incidentally, the outer working involves, for example, working for dimensions specified for the circuit board 20. Also, in the second exemplary embodiment, the portions defining the screw holes 23 shown in FIGS. 9A to 9D are formed.

After that, in an inspection process, the circuit board 20 obtained by working the board 70 undergoes checks for electrical continuity, broken lines, short circuits or the like of the circuit pattern, and an acceptable product is utilized as the circuit board 20.

The circuit board 20 obtained in this manner undergoes the mounting of the LED chips 21 and the formation of the lenses 30 by the procedure shown in FIG. 6 described with reference to the first exemplary embodiment, and thereby the light emitting module 12 is obtained. The formation of the lenses 30 is accomplished by the same approach as the first exemplary embodiment. Specifically, the attachment of the lenses 30 is accomplished by injecting the resin for the lens into the space formed by sandwiching the circuit board 20 between the lower and upper molding frames 41 and 42 shown in FIGS. 7A and 7B.

FIGS. 12A to 12D show the configuration of the light emitting module 12 obtained in this manner. Specifically, FIG. 12A is a top surface view of the light emitting module 12; FIG. 12B is a rear surface view of the light emitting module 12; FIG. 12C is a side view of the light emitting module 12 as viewed from the direction of its length; and FIG. 12D is a sectional view taken along the line XIID-XIID of FIG. 12B.

The lenses 30 are formed on the top surface of the circuit board 20 that constitutes the light emitting module 12, that is, on the surface of the circuit board 20 on which the LED chips 21 are mounted, so as to cover the LED chips 21. Incidentally, in the second exemplary embodiment, the LED chips 21 are mounted on the portions defining the through holes 28 provided in the circuit board 20. The lenses 30 are each formed integrally with a connecting section 31 present in the portions defining the gate holes 27 and a supporting section 32 present in each runner 26 provided in the rear surface of the circuit board 20. In other words, also in the first exemplary embodiment, similarly to the first exemplary embodiment, lenses 30 provided on the top surface of the circuit board 20 are supported by the supporting sections 32 provided on the rear surface of the circuit board 20, via the connecting sections 31. At this time, the supporting sections 32 are inside the runners 26 formed in the circuit board 20. Thus, the lenses 30 are fixed on the circuit board 20 (or the LED chips 21) with stability. Therefore, the second exemplary embodiment may also suppress the occurrence of a situation where, for example, when a shock is given to the supporting section 32, a connection part to the connecting section 31 is broken and thus the lens 30 is detached from the circuit board 20.

Also, in the light emitting module 12, similarly to the first exemplary embodiment, the supporting section 32 is configured so as to fill the runners 26, and the height of a portion thereof exposed on the rear surface of the circuit board 20 is the same as the height of the level of the rear surface of the circuit board 20. Also in the second exemplary embodiment, the heat radiation sheet 18 is mounted on the rear surface of the light emitting module 12 as shown in FIGS. 2A and 2B, and, as shown in FIGS. 12C and 12D, for example, the supporting section 32 is not projected from the rear surface of the circuit board 20. Therefore, the second copper foil 73 provided on the rear surface of the circuit board 20 that constitutes the light emitting module 12 may be brought into close contact with the heat radiation sheet 18.

In the second exemplary embodiment, the second copper foil 73 is exposed on the rear surface of the circuit board 20 exclusive of the areas where the runners 26 are formed. The second copper foil 73 is connected to the LED chips 21 via the plated electroless-copper layers formed on the portions defining the through holes 28. As a result, heat produced when the LED chips 21 provided on the light emitting module 12 are driven to emit light may escape to the backlight frame 11 through the portions defining the through holes 28, the second copper foil 73 and the heat radiation sheet 18, and this enables suppressing a rise in the temperature of the light emitting module 12.

Also, in the second exemplary embodiment, etching, rather than such machining as is used in the first exemplary embodiment, is used to form the runners 26 for use in the injection of the resin for the lens. This enables the formation of the runners 26 simultaneously with the formation of the circuit pattern, and thus enables a simplification of a manufacturing process and also a reduction in manufacturing costs, as compared to the formation of the runners 26 by the machining such as cutting.

Incidentally, in the first and second exemplary embodiments, the photoconductive dry film 64 is used to form the resist film for the exposure; however, the formation of the resist film is not limited to this, and a coating of a liquid resist material, for example, may be applied to form the resist film for the exposure.

Also, in the first and second exemplary embodiments, description has been given taking an instance where the LED chip 21 is used as the solid-state light emitting element; however, the solid-state light emitting element is not limited to this.

Further, in the exemplary embodiments, description has been given with regard to the light emitting module 12 that functions as the backlight device for the liquid crystal display module 50; however, the light emitting module 12 is not limited to this, and the light emitting module 12 may be applied, for example, to a display apparatus configured to selectively drive plural LED chips 21 for light emission, and thereby text or image information is displayed. Further, the light emitting module 12 may be utilized, for example, as a lighting apparatus.

DESCRIPTION OF REFERENCE NUMERALS AND SIGNS

10 . . . backlight device, 11 . . . backlight frame, 12 . . . light emitting module, 13 . . . diffusion plate, 14, 15 . . . prism sheets, 16 . . . brightness improvement film, 18 . . . heat radiation sheet, 20 . . . circuit board, 21 . . . LED chip, 26 . . . runner, 27 . . . portion defining a gate hole, 28 . . . portion defining a through hole, 30 . . . lens, 31 . . . connecting section, 32 . . . supporting section, 50 . . . liquid crystal display module, 51 . . . liquid crystal panel, 52 . . . polarization plate, 53 . . . polarization plate, 60 . . . board, 61 . . . aluminum base, 62 . . . insulating layer, 63 . . . copper foil, 64 . . . photoconductive dry film, 65 . . . mask, 66 . . . resist layer, 67 . . . plated silver layer, 70 . . . board, 71 . . . glass-epoxy base, 72 . . . first copper foil, 73 . . . second copper foil

The invention claimed is:

1. A light emitting apparatus, comprising:
a board in which a portion defining a penetration hole penetrating from one surface to the other surface is formed, and that has a recess, in the other surface, in a region where the portion defining the penetration hole is formed;
a solid-state light emitting element mounted on the one surface of the board proximate to where the penetration hole penetrates;
a cover member that covers the solid-state light emitting element mounted on the one surface of the board proximate to where the penetration hole penetrates;
a connecting section formed in the penetration hole; and
a supporting section formed in the recess provided in the other surface of the board, the connecting section connecting the supporting section to the cover member, wherein
a plurality of the solid-state light emitting elements are mounted on the one surface of the board,
the board is provided with a plurality of the portions defining the penetration holes corresponding to the plurality of solid-state light emitting elements, and
the recess provided in the other surface of the board is formed so as to pass on at least two positions which each have the portion defining the penetration hole formed therein.

2. The light emitting apparatus according to claim 1, wherein, in the recess, the supporting section is formed at or below a height of the other surface.

3. The light emitting apparatus according to claim 1, wherein, in the other surface of the board, a metal layer, and the recess formed by removing the metal layer are provided.

4. The light emitting apparatus according to claim 3, wherein
the board further includes a portion defining a through hole obtained by forming a metal film on an inner wall of a portion defining a different penetration hole formed at a position where the solid-state light emitting element is mounted, and
the portion defining the through hole is connected to the metal layer provided on the other surface of the board.

5. The light emitting apparatus according to claim 1, wherein an end of the recess is exposed on a side of an end of the board.

6. A display apparatus including a display panel for image display and a backlight facing toward a back side of the display panel and irradiating the display panel with light from the back side of the display panel, wherein
the backlight includes:
a board in which a portion defining a penetration hole penetrating from one surface to the other surface is formed, and that has a recess, in the other surface, in a region where the portion defining the penetration hole is formed;
a solid-state light emitting element that is mounted on the one surface of the board proximate to where the penetration hole penetrates;
a molded member that is formed by integrally molding a protecting section protecting the solid-state light emitting element mounted on the one surface of the board, a connecting section formed in the penetration hole and connected to the protecting section, and a supporting section provided in the recess formed in the other surface of the board, the supporting section being connected to the connecting section; and
a heat radiation member that is disposed in contact with the other surface of the board, and that radiates heat produced in the board, wherein
a plurality of the solid-state light emitting elements are mounted on the one surface of the board,
the board is provided with a plurality of the portions defining the penetration holes corresponding to the plurality of solid-state light emitting elements, and
the recess provided on the other surface of the board is formed so as to pass on at least two positions which each have the portion defining the penetration hole formed therein.

7. The display apparatus according to claim 6, wherein the supporting section of the molded member is set at or below a height of the other surface of the board.

8. The display apparatus according to claim 6, wherein, in the other surface of the board, a metal layer, and the recess formed by removing the metal layer are provided.

9. The display apparatus according to claim 8, wherein
the board further includes a portion defining a through hole obtained by forming a metal film on an inner wall of a portion defining a different penetration hole formed at a position where the solid-state light emitting element is mounted, and
the portion defining the through hole is connected to the metal layer provided on the other surface of the board.

10. The display apparatus according to claim 6, wherein an end of the recess is exposed on a side of an end of the board.

* * * * *